(12) United States Patent
Chen

(10) Patent No.: US 8,226,058 B2
(45) Date of Patent: Jul. 24, 2012

(54) SADDLE MOUNTING DEVICE

(75) Inventor: Chao-Hu Chen, Taichung Hsien (TW)

(73) Assignee: Kalloy Industrial Co., Ltd., Taichung Hsien (TW)

( * ) Notice: Subject to any disclaimer, the term of this patent is extended or adjusted under 35 U.S.C. 154(b) by 132 days.

(21) Appl. No.: 12/848,205

(22) Filed: Aug. 1, 2010

(65) Prior Publication Data

US 2012/0025043 A1 Feb. 2, 2012

(51) Int. Cl.
*B60N 2/38* (2006.01)
(52) U.S. Cl. ............. 248/219.4; 248/220.22; 297/195.1; 297/215.14; 297/215.15; 403/374.2
(58) Field of Classification Search ............... 248/219.4, 248/220.22; 297/195.1, 215.14, 215.15; 403/84, 374.2
See application file for complete search history.

(56) References Cited

U.S. PATENT DOCUMENTS

| | | | | | |
|---|---|---|---|---|---|
| 3,856,244 | A | * | 12/1974 | Menshen | 248/67.5 |
| 4,142,813 | A | * | 3/1979 | Laborde | 403/391 |
| 4,224,721 | A | * | 9/1980 | Ohlson | 24/489 |
| 4,275,922 | A | * | 6/1981 | Juy | 297/215.14 |
| 4,502,811 | A | * | 3/1985 | Patriarca | 403/391 |
| 5,020,851 | A | * | 6/1991 | Chen | 297/195.1 |
| 5,226,624 | A | * | 7/1993 | Kingsbery | 248/219.2 |
| 5,443,301 | A | * | 8/1995 | Lai | 297/195.1 |
| 5,695,241 | A | * | 12/1997 | Olsen et al. | 297/195.1 |
| 5,722,718 | A | * | 3/1998 | Still et al. | 297/215.15 |
| 5,915,784 | A | * | 6/1999 | Clark | 297/215.15 |
| 5,921,145 | A | * | 7/1999 | Muser | 74/551.2 |
| 5,979,978 | A | * | 11/1999 | Olsen et al. | 297/215.15 |
| 5,988,741 | A | * | 11/1999 | Voss et al. | 297/215.15 |
| 6,523,790 | B2 | * | 2/2003 | Sentpali et al. | 248/68.1 |
| 6,536,982 | B2 | * | 3/2003 | Gibbons et al. | 403/97 |
| 6,789,976 | B2 | * | 9/2004 | Hung et al. | 403/84 |
| 6,805,513 | B2 | * | 10/2004 | Marquina | 403/107 |
| 6,860,454 | B1 | * | 3/2005 | Gronowicz, Jr. | 248/71 |
| 7,059,672 | B2 | * | 6/2006 | Saccucci | 297/195.1 |
| 7,559,604 | B2 | * | 7/2009 | Beaulieu | 297/215.15 |
| 7,562,933 | B1 | * | 7/2009 | Chao et al. | 297/215.13 |
| 7,621,595 | B1 | * | 11/2009 | Chen | 297/215.15 |
| 2003/0156891 | A1 | * | 8/2003 | Hung et al. | 403/84 |

* cited by examiner

*Primary Examiner* — Terrell McKinnon
*Assistant Examiner* — Daniel J Breslin

(57) ABSTRACT

A saddle mounting device includes a support member having a mounting portion formed thereon. A lower base is connected with the support member. The lower base has two guiding flanges diametrically formed thereon. Two gaps are respectively defined between the two guiding flanges. The lower base has two first engaging grooves defined therein. An upper base is movably connected with the lower base. The upper base has two sliding rods formed thereon for sliding along the two guiding flanges and are guided into the two gaps. The upper base has two second engaging grooves defined therein for corresponding to the two first engaging grooves. A fastener connects the support member with the lower base and is screwed with the upper base. The upper base is simultaneously moved relative to the lower base by a rotation of the fastener.

4 Claims, 6 Drawing Sheets

SADDLE MOUNTING DEVICE

BACKGROUND OF THE INVENTION

1. Field of the Invention

The present invention relates to a saddle mounting device, and more particularly to a saddle mounting device disposed between a saddle and a seat post for quickly mounting the saddle on the seat post.

2. Description of Related Art

Cycling is a popular leisure activity. Most people would ride a bike with family or friends in the weekends. As more and more people indulge themselves in cycling, a demand for innovation and improvement of bicycles and bicycle parts has arisen.

A conventional saddle mounting device in accordance with the prior art comprises a base connected with a seat post. The base has a support plate disposed thereon. An upper plate and a lower plate are disposed on a top the base. Two rails of a saddle are respectively disposed on two opposite sides of the lower plate. The two rails of the saddle are located between the upper plate and the lower plate. Two screw bolts sequentially securely connect the support plate, the lower plate, and the upper plate together. Each screw bolt sequentially passes through a washer, a through hole of the support plate and the lower plate and is screwed with the upper plate for fixedly clamping the two rails of the saddle.

However, when assembling, it is inconvenient that a user operates one screw bolt by one hand and controls the washer, the lower plate and the upper plate in an assembling position by the other hand. When adjusting the saddle, the screw bolts are screwedly loosened for releasing the upper plate from the lower plate. The lower plate easily falls off from the support plate. Therefore, the conventional saddle mounting device has some disadvantages and needs to be improved.

The present invention has arisen to mitigate and/or obviate the disadvantages of the conventional saddle mounting device.

SUMMARY OF THE INVENTION

The main objective of the present invention is to provide an improved saddle mounting device.

To achieve the objective, the saddle mounting device in accordance with the present invention includes a support member having a mounting portion formed thereon and extending from one end thereof. The mounting portion configures into an arc shape. The mounting portion has an elongated groove defined in a top thereof. The mounting portion has a recess defined in a bottom thereof and communicating with the elongated groove. A washer is received in the recess.

A lower base is fixedly connected with the support member and is located above the top of the mounting portion. The lower base has a retaining recess defined in a bottom thereof for correspondingly and securely receiving the mounting portion of the support member. The lower base has a through hole defined therein. The lower base has two guiding flanges formed thereon and diametrically located around the through hole. One of the two guiding flanges has a channel defined therein. Each guiding flange has a guiding surface disposed on a top thereof. Two gaps are respectively defined between the two guiding flanges. The lower base has two bores defined therein and diametrically located around the through hole. The two bores are respectively defined in the two gaps between the two guiding flanges. The retaining recess communicates with the through hole. The lower base having two first engaging grooves defined in a top thereof and respectively located at two opposite sides thereof.

An upper base is movably connected with the lower base and located above the top of the lower base. The upper base has a screw hole defined therein and extending therethrough. The screw hole corresponds to the through hole in the lower base. The upper base has two sliding rods formed thereon and downwardly extending from a bottom thereof. The two sliding rods respectively correspond to the two guiding surfaces of the two guiding flanges. The two sliding rods are able to be respectively and partially received in the two bores in the lower base for engagedly connecting the upper base with the lower base. The upper base has two second engaging grooves defined in the bottom thereof and respectively located at two opposite sides thereof for corresponding to the two first engaging grooves in the lower base.

A fastener sequentially passes through the washer, the recess, the elongated groove in the mounting portion, and the through hole in the lower base. And the fastener is screwed in the screw hole in the upper base, such that the upper base is simultaneously rotatably moved relative to the lower base by a rotation of the fastener.

A coil spring compressibly sleeves on the fastener and is disposed between the lower base and the upper base. The coil spring has a distal end engagedly received in the channel. The other distal end of the coil spring abuts between two sliding rods, wherein when the upper base releases from the lower base, the coil spring provides a resilient force to restore the upper base.

Accordingly, the fastener is rotated to simultaneously drive the upper base to rotate. Each sliding rod slides along the corresponding guiding surface and is guided into the corresponding gap. The two sliding rods are respectively restricted within the two gaps. The fastener is rotated to drive the upper base to axially move toward the lower base. Consequently, the two sliding rods are respectively guided into and partially received in the two bores. When the upper base moves toward the lower base, the two first engaging grooves of the lower base and the two second engaging grooves of the upper base adapt to respectively securely receive two rails of a saddle.

In accordance with a second aspect of the present invention, the mounting portion of the support member has a series of first tooth formed on the top thereof. The lower base has a series of second tooth formed on a bottom of the retaining recess and corresponding to the first teeth of the mounting portion, such that the first teeth selectively engage with the second teeth for adjustably positioning the lower base on the mounting portion of the support member.

Further benefits and advantages of the present invention will become apparent after a careful reading of the detailed description with appropriate reference to the accompanying drawings.

DETAILED DESCRIPTION OF THE INVENTION

Figure 1:
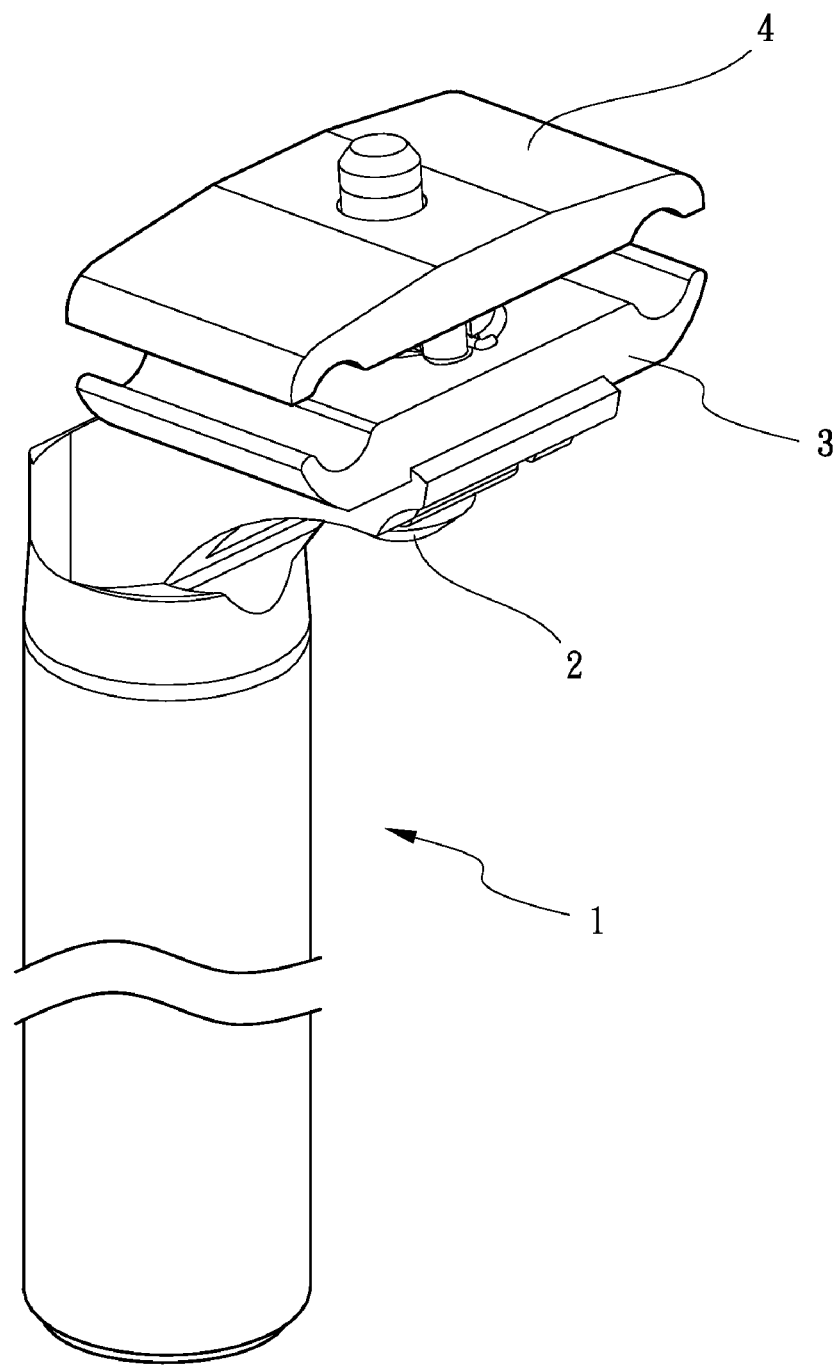
FIG. 1 is an assembled perspective view of a preferred embodiment of a saddle mounting device in accordance with the present invention.
Figure 2:
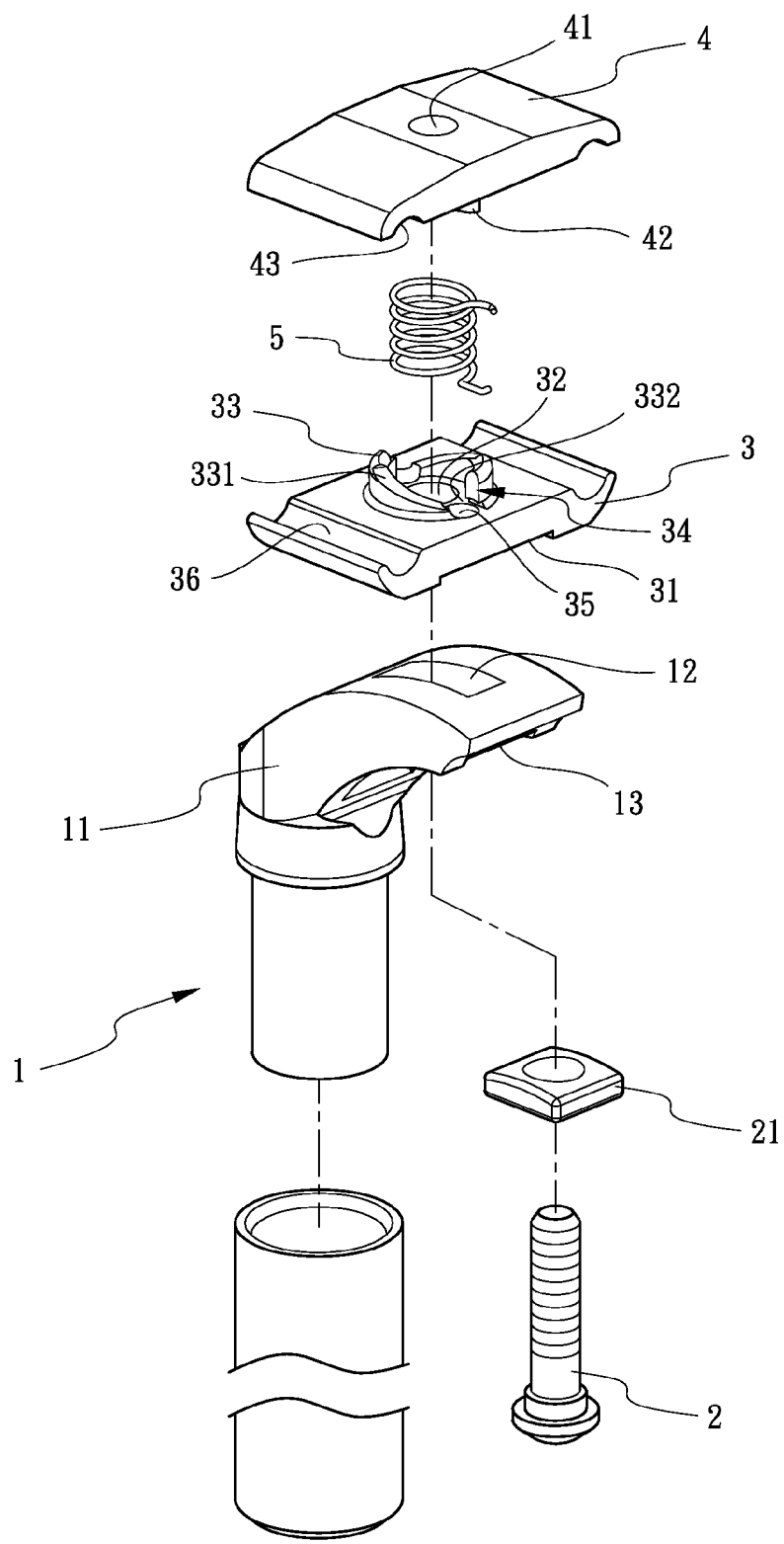
FIG. 2 is an exploded perspective view of the preferred embodiment of the saddle mounting device in accordance with the present invention.

Referring to the drawings and initially to FIGS. 1-2, a saddle mounting device in accordance with the present invention comprises a support member 1 having a bottom end for connecting with a seat post of a bicycle (not shown). The support member 1 has a mounting portion 11 formed on a top end thereof and outwardly extending therefrom. The mounting portion 11 configures into an arc shape. The mounting portion 11 has an elongated groove 12 defined in a top thereof. The mounting portion 11 has a recess 13 defined in a bottom thereof and coaxially communicating with the elongated groove 12. A washer 21 is coaxially received in the recess 13.

A lower base 3 is fixedly connected with the support member 1 and is located above the top of the mounting portion 11. The lower base 3 has a retaining recess 31 defined in a bottom thereof for correspondingly and securely receiving the mounting portion 11 of the support member 1. The lower base 3 has a through hole 32 vertically defined therein. The through hole 32 communicates with the retaining recess 31 and corresponds to the elongated groove 12 of the mounting portion 11. The lower base 3 has two guiding flanges 33 formed on a top thereof and diametrically located around the through hole 32. One of the two guiding flanges 33 has a channel 332 laterally defined therein. Each guiding flange 33 has a guiding surface 331 disposed on a top thereof. Two gaps 34 are respectively defined between the two guiding flanges 33. The lower base 3 has two bores 35 defined therein and diametrically located around the through hole 32. The two bores 35 are respectively positioned in the two gaps 34 between the two guiding flanges 33. Each guiding surface 331 is inclined toward the corresponding bore 35. The lower base 3 having two first engaging grooves 36 horizontally defined in the top thereof and respectively located at two opposite sides thereof.

An upper base 4 is movably connected with the lower base 3 and located above the top of the lower base 3. The upper base 4 has a screw hole 41 defined therein and vertically extending therethrough. The screw hole 4 coaxially corresponds to the through hole 32 in the lower base 3. The upper base 4 has two sliding rods 42 formed thereon and downwardly extending from a bottom thereof. A distance between the two sliding rods 42 corresponds to a distance between the two guiding surfaces 331 of the two guiding flanges 33. The two sliding rods 42 are able to be respectively and partially received in the two bores 35 in the lower base 3 for engagedly connecting the upper base 4 with the lower base 3. The upper base 4 has two second engaging grooves 43 horizontally defined in the bottom thereof and respectively located at two opposite sides thereof for corresponding to the two first engaging grooves 36 in the lower base 3.

A fastener 2 has a threaded end (not numbered) sequentially passing through the washer 21, the recess 13, the elongated groove 12 in the mounting portion 11, and the through hole 32 in the lower base 3. And the threaded end of the fastener 2 is screwed in the screw hole 41 in the upper base 4, such that the upper base 4 is simultaneously rotatably moved relative to the lower base 3 by a rotation of the fastener 2.

A coil spring 5 compressibly sleeves on the fastener 2 and is disposed between the lower base 3 and the upper base 4. The coil spring 5 has a distal end engagedly received in the channel 332. The other distal end of the coil spring 5 abuts between two sliding rods 42, wherein when the upper base 4 releases from the lower base 3, the coil spring 5 provides a resilient force to restore the upper base 4.

Figure 3:
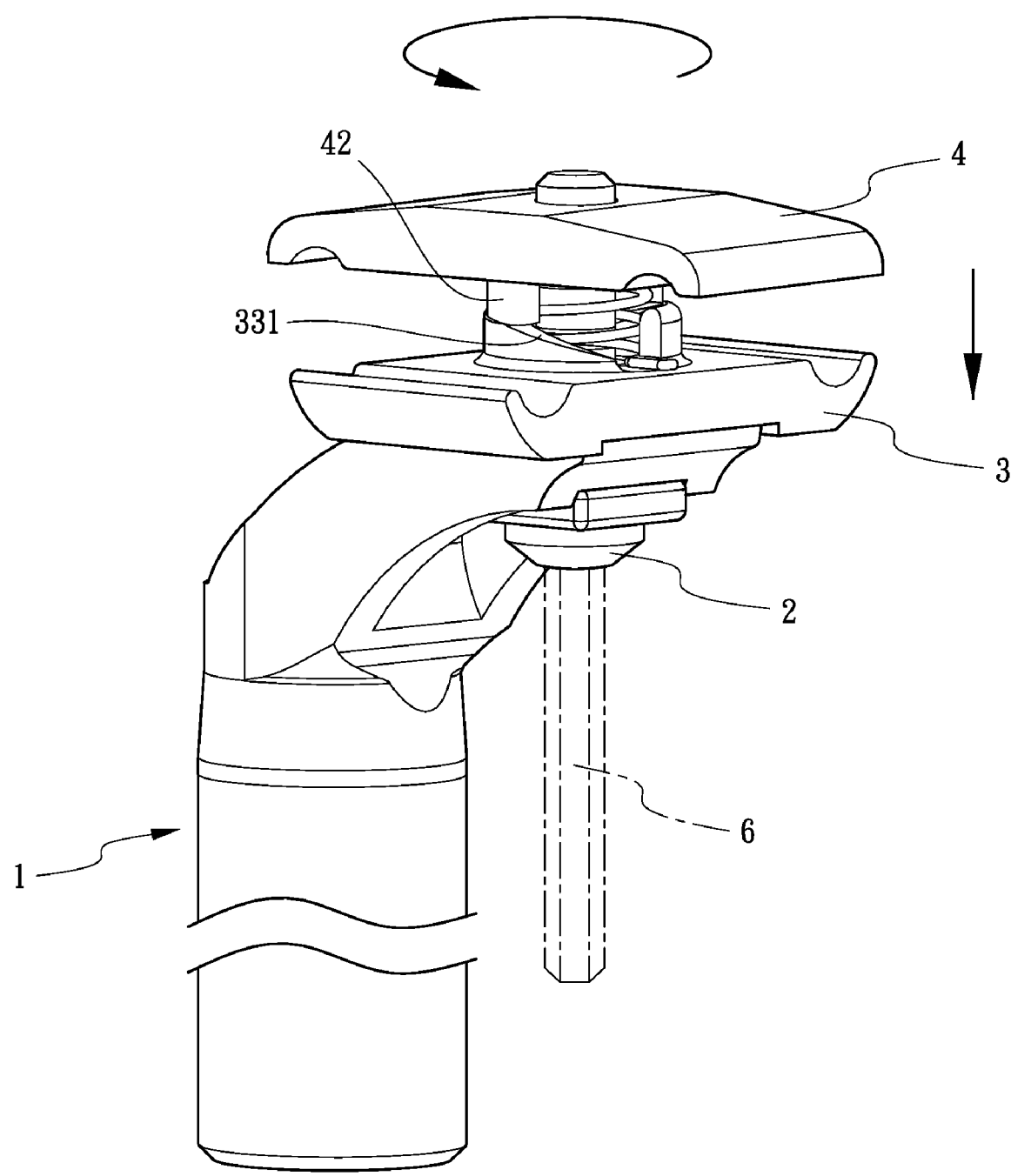
FIGS. 3-4 are operational perspective views of the preferred embodiment of the saddle mounting device in accordance with the present invention.
Figure 4:
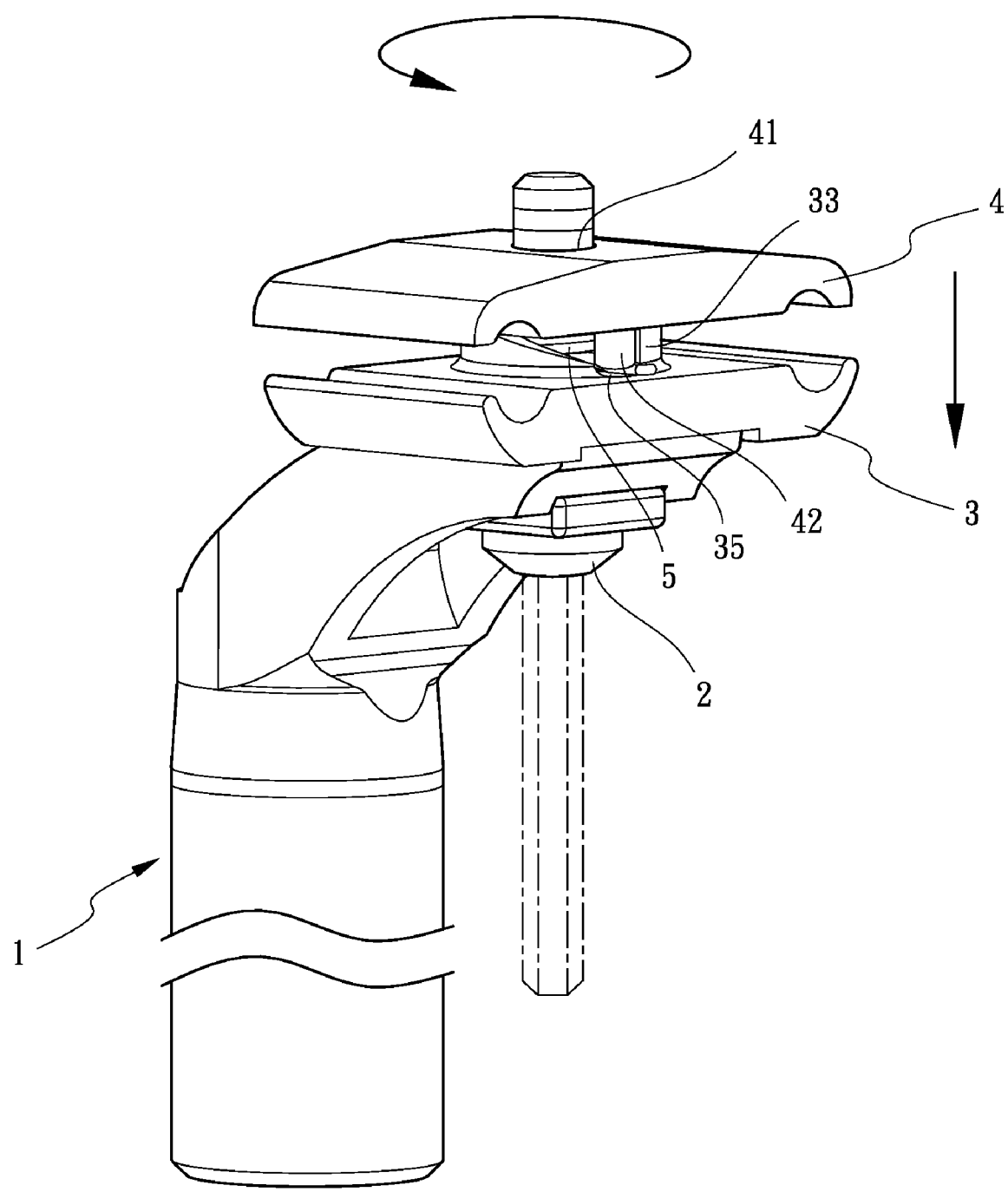
Figure 5:
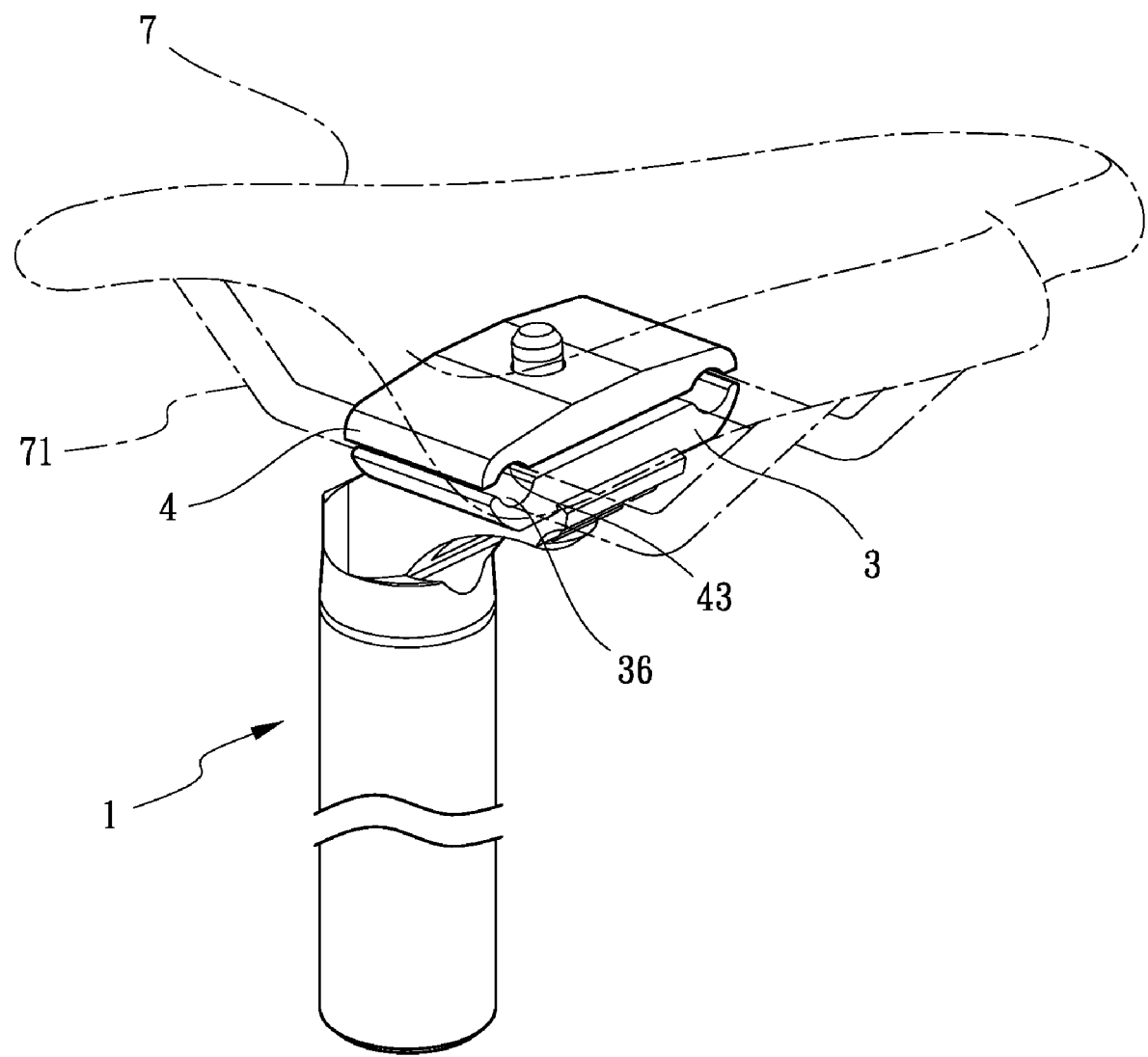
FIG. 5 is a perspective view of the preferred embodiment of the saddle mounting device in accordance with the present invention as a saddle is mounted on the saddle mounting device.

The operation of the saddle mounting device in accordance with the present invention will be described in detailed below. As shown in FIGS. 3-5, when the fastener 2 is rotated in a direction by a hand tool 6, the upper base 4 simultaneously rotates by the rotation of the fastener 2. Each sliding rod 42 which rotates with the upper base 4 moves along the corresponding inclined guiding surface 331 of the guiding flange 33 and slides into the corresponding gap 34. When the two sliding rods 42 are restricted within the two gaps 34, the fastener 2 is rotated to drive the upper base 4 to axially move toward the lower portion 3. The coil spring 5 is compressed by the upper base 4 and the lower base 3. The two sliding rods 42 are respectively guided into and partially received into the two bores 35 between the two guiding flanges 33, the two first engaging grooves 36 in the lower base 3 are correspondingly and respectively parallel to the two second engaging grooves 43 in the upper base 4. Accordingly, the two first engaging grooves 36 and the two second engaging grooves 43 are connected together and receive two rails 71 of a saddle 7 (shown in FIG. 5), such that the rails 71 of the saddle 7 are quickly securely clamped by the upper base 4 and the lower base 3.

When the fastener 2 is rotated in a reverse direction by the hand tool 6, the two sliding rods 42 with the upper base 4 are driven by the rotation of the fastener 2 to release from the two bores 35 in the lower base 3. The coil spring 5 provides the resilient force to restore the upper base 4. The upper base 4 rotates and axially moves away from the lower base 3. The two first engaging grooves 36 move to be perpendicular to the two second engaging grooves 43, such that the saddle 7 is quickly released and easily adjusted.

Figure 6:
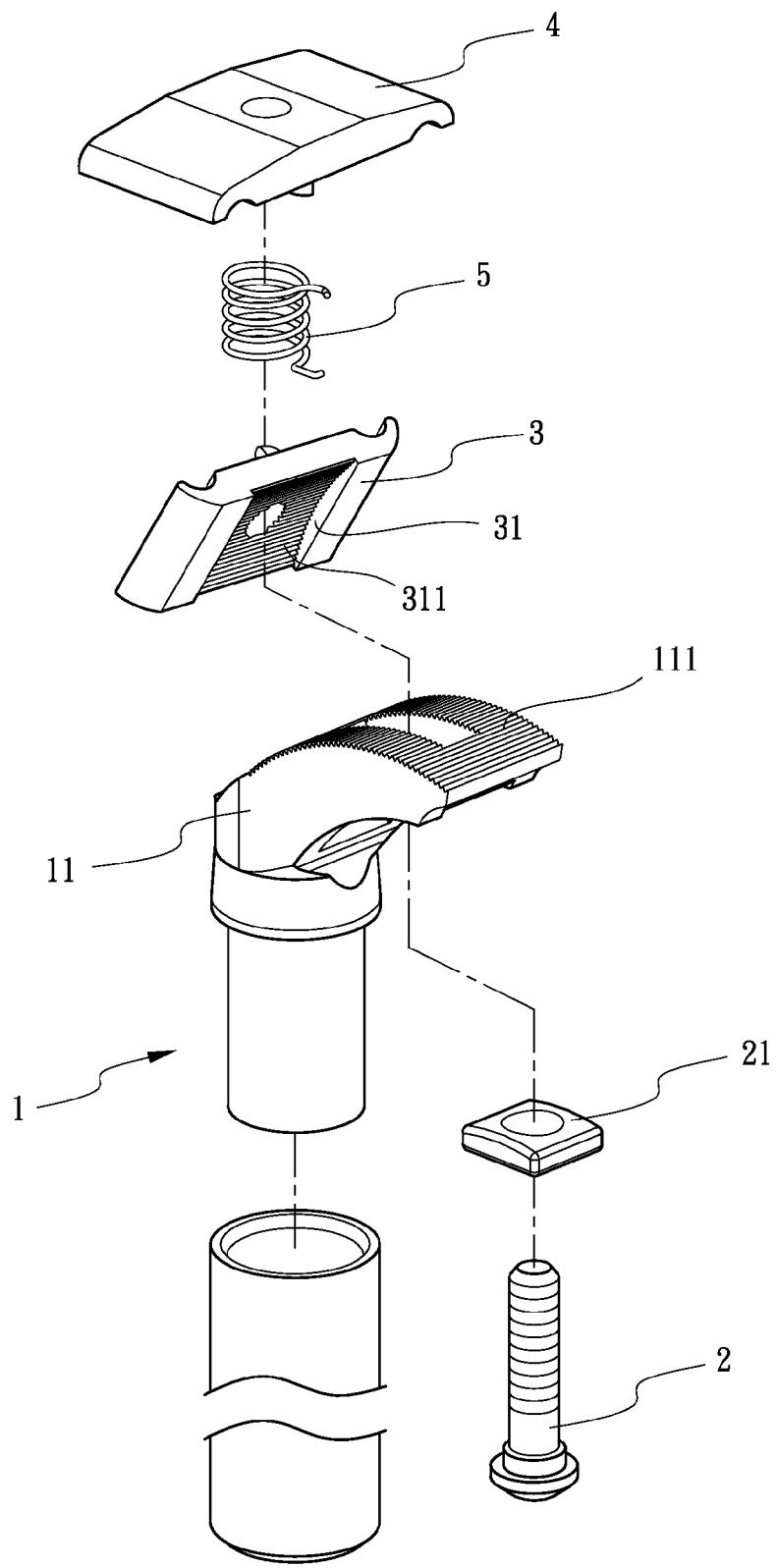
FIG. 6 is an exploded perspective view of a second embodiment of the saddle mounting device in accordance with the present invention.

With reference to FIG. 6, that shows a second embodiment of the saddle mounting device in accordance with the present invention. The elements and effects of the second embodiment which are the same with the first embodiment are not described, only the differences are described. In this embodiment, the mounting portion 11 of the support member 1 has a series of first tooth 111 formed on the top thereof. The lower base 3 has a series of second tooth 311 formed on a bottom of the retaining recess 31 and corresponding to the first teeth 111 of the mounting portion 11, such that the first teeth 111 selectively engage with the second teeth 311 for adjustably positioning the lower base 3 on the mounting portion 11 of the support member 1.

Although the invention has been explained in relation to its preferred embodiment, it is to be understood that many other possible modifications and variations can be made without departing from the spirit and scope of the invention as hereinafter claimed.

What is claimed is:

1. A saddle mounting device comprising:
   a support member having a mounting portion formed thereon and extending from one end thereof, the mounting portion configuring into an arc shape, the mounting portion having an elongated groove defined therein;
   a lower base fixedly connected with the support member and located above a top of the mounting portion, the lower base having a through hole defined therein, the lower base having two guiding flanges formed thereon and diametrically located around the through hole, each guiding flange having a guiding surface disposed on a top thereof, two gaps respectively defined between the two guiding flanges, the lower base having two first engaging grooves defined in a top thereof and respectively located at two opposite sides thereof;

an upper base movably connected with the lower base and located above the top of the lower base, the upper base having a screw hole defined therein and extending therethrough, the upper base having two sliding rods formed thereon and extending from a bottom thereof, the two sliding rods respectively corresponding to the two guiding surfaces of the two guiding flanges, such that each sliding rod slides along the corresponding guiding surface of the guiding flange and is guided into the corresponding gap, the upper base having two second engaging grooves defined in the bottom thereof and respectively located at two opposite sides thereof for corresponding to the two first engaging grooves;

a fastener passing through the elongated groove of the mounting portion and the through hole of the lower base and screwed in the screw hole, the upper base simultaneously rotatably moved relative to the lower base by a rotation of the fastener; and a coil spring compressibly sleeving on the fastener and disposed between the lower base and the upper base, one of the two guiding flanges having a channel defined therein, the coil spring having a distal end engagedly received in the channel, the other distal end of the coil spring abutting between two sliding rods, the coil spring providing a resilient force to restore the upper base when the upper base releasing from the lower base;

wherein when the fastener is rotated to simultaneously drive the upper base to rotate, each sliding rod slides along the corresponding guiding surface and is guided into the corresponding gap, the two sliding rods respectively restricted within the two gaps, the fastener rotated to drive the upper base to axially move toward the lower base, the two first engaging grooves of the lower base and the two second engaging grooves of the upper base adapt to respectively securely receive two rails of a saddle.

2. The saddle mounting device as claimed in claim 1, wherein the lower base has a retaining recess defined in a bottom thereof for correspondingly and securely receiving the mounting portion of the support member, the retaining recess communicating with the through hole.

3. The saddle mounting device as claimed in claim 1, wherein the support member has a recess defined in a bottom of the mounting portion and communicating with the elongated groove, a washer received in the recess, the fastener passing through the washer, the recess and the elongated groove in the mounting portion.

4. The saddle mounting device as claimed in claim 1, wherein the lower base has two bores defined therein and diametrically located around the through hole, the two bores respectively located at the two gaps between the two guiding flanges, such that the two sliding rods of the upper base are respectively and partially received in the corresponding bore.

* * * * *